March 6, 1956 W. F. MULLER 2,737,624
TRANSDUCER
Filed Jan. 29, 1952 3 Sheets-Sheet 1
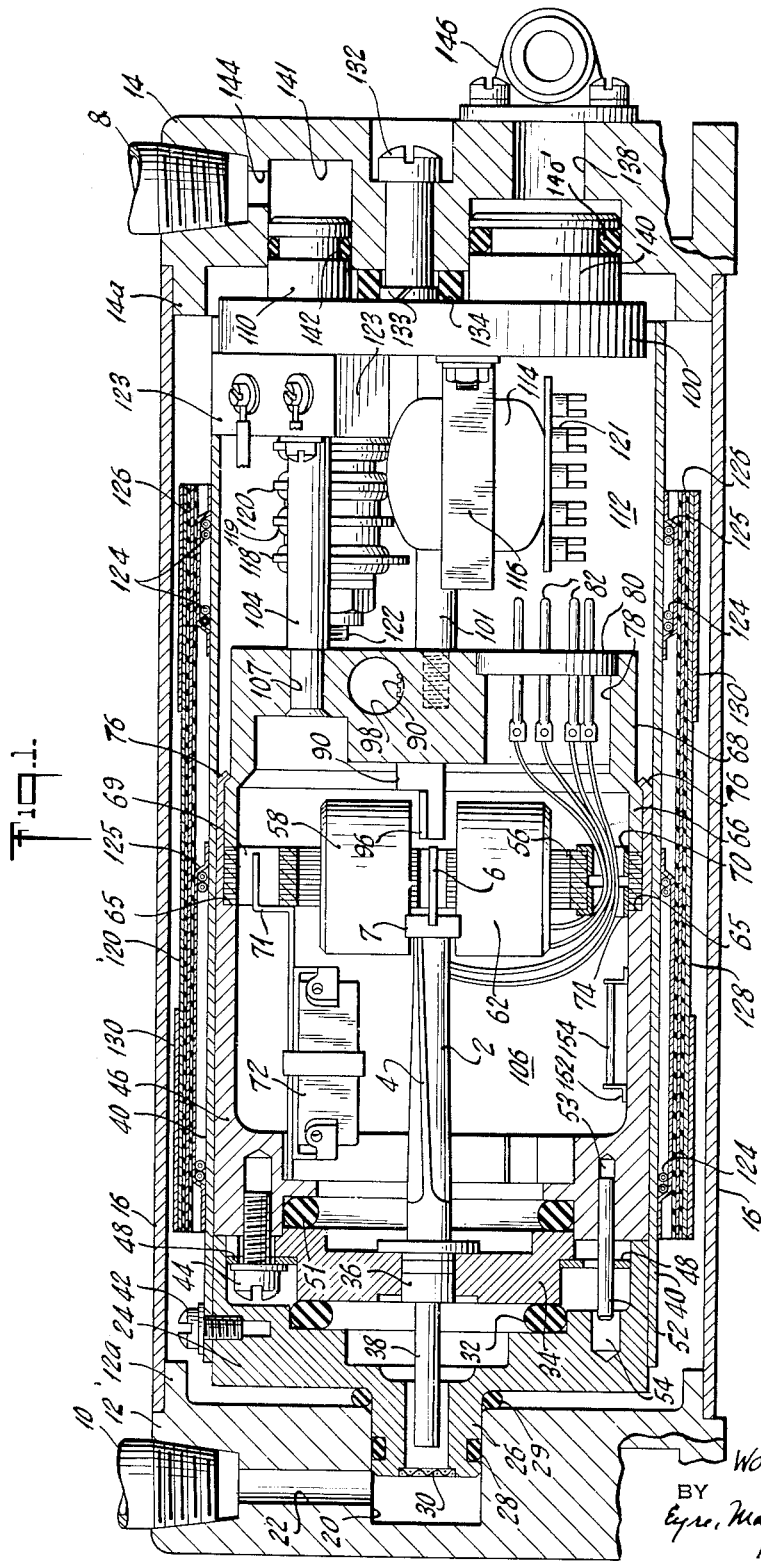
INVENTOR
WOLF F. MULLER
BY
Eyre, Mann & Burrows
ATTORNEYS

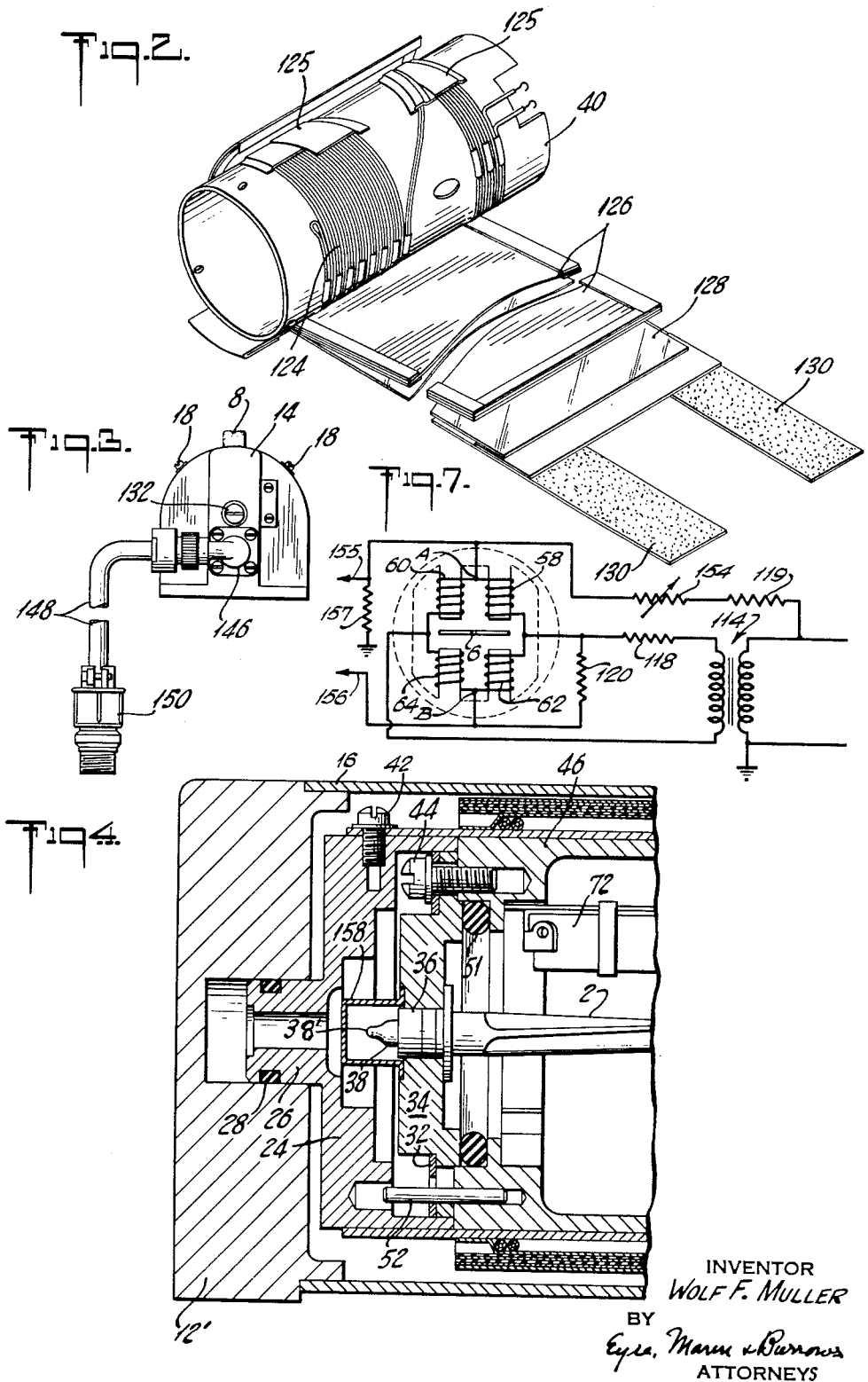

March 6, 1956
W. F. MULLER
2,737,624
TRANSDUCER
Filed Jan. 29, 1952
3 Sheets-Sheet 3
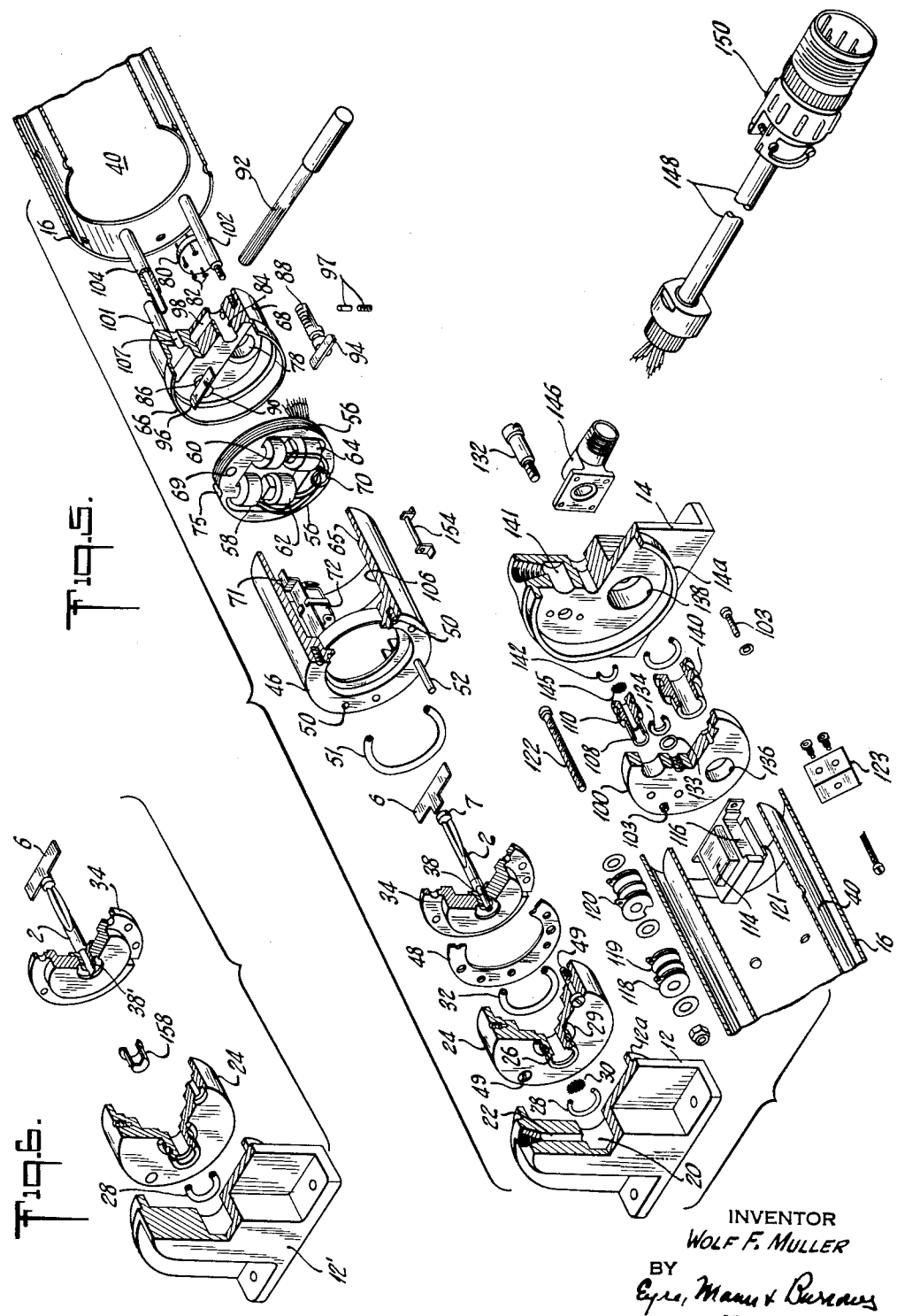
INVENTOR
*Wolf F. Muller*
BY
*Eyre, Mann & Burrows*
ATTORNEYS

United States Patent Office 2,737,624
Patented Mar. 6, 1956

2,737,624

TRANSDUCER

Wolf F. Muller, Los Angeles, Calif., assignor to Servomechanisms, Inc., a corporation of New York Application January 29, 1952, Serial No. 268,831

9 Claims. (Cl. 323—61)

The present invention relates to transducers for converting changes in pressure into corresponding changes in an electrical output signal and comprises a precision instrument of this type that is sensitive, compact and accurate and has a long useful life. The new transducer, although of general application, is of particular value for use in aircraft for delivering to computing or indicating apparatus electrical signals varying in accordance with the static pressure acting on the aircraft or with the difference between the total pressure of the air stream and the static pressure. The new transducer is constructed to be substantially insensitive to changes in the ambient temperature. It is constructed to give a linear response over a relatively wide range and incorporates means for readily adjusting the scale factor and for zeroizing the output signal for any desired position of the pressure responsive element.

The pressure responsive element of the new transducer is a spirally ribbed, short, straight tube which twists or untwists about its axis with change in the difference in pressure within and without the tube. The tube is fixedly mounted at one end and carries at its other end an armature for a four pole circular magnetic field structure carrying pick-off coils for delivering the electrical output signal. The pressure sensitive tube, the circular pick-off arrangement, and cooperating temperature controlling and compensating elements hereinafter described are all mounted within a sealed enclosure within a tubular container which is provided at its ends with coupling means for the pressure and electrical connections.

For a better understanding of the invention, reference may be had to the accompanying drawings, in which—

Fig. 1 is a longitudinal sectional view of a transducer embodying the invention;

Fig. 2 is an isometric view of the heating coil and parts associated therewith of the transducer of Fig. 1, the insulating and reflecting layers associated with the coil being shown partially unwrapped for facilitating the identification thereof;

Fig. 3 is an end view of the transducer of Fig. 1;

Fig. 4 is a longitudinal sectional view illustrating a modification of one end of the transducer of Fig. 1;

Fig. 5 is an exploded isometric view of the transducer of Fig. 1, the heating coil and associated wrapping being omitted;

Fig. 6 is an exploded isometric view of the modification shown in section in Fig. 4; and Fig. 7 is a diagram of the pick-off circuit.

The transducer shown in Figs. 1 to 3 and 5 is adapted to deliver an electrical output signal varying with the difference between two variable pressures, whereas the modification illustrated in Figs. 4 and 6 is adapted to yield an output signal varying with a single variable pressure. The pressure sensitive element and electrical pick-off arrangement in each modification are the same, the main difference between the two transducers being the provision in the pressure differential transducer of connections for delivering the second variable pressure to the transducer. The pressure sensitive element comprises a twisted Bourdon tube 2 having spiral ribs 4 thereon. An armature 6, which cooperates with a field structure and pick-off coils hereinafter to be described, is carried by a button 7 soldered to one end of the tube 2. The tube 2 responds to the difference between the internal and external pressures acting upon its wall, the pitch of the ribs decreasing with increase in external pressure or decrease in internal pressure. In the pressure differential transducer the hermetically sealed chamber within which the tube is mounted is connected through tubing and ports to a fitting 8 at one end of the device and the interior of the tube is connected through other ports to a fitting 10 at the other end of the device. In the case of the transducer of Figs. 4 to 6, the tube is sealed off to maintain the internal pressure constant and thus obviating the necessity for the fitting 10.

The pressure differential transducer of the invention will now be described with particular reference to Figs. 1, 2 and 5. The structure comprises two mounting blocks 12 and 14, each of which has a flat lower part adapted to be shock-mounted on a suitable base and a circular flange 12a and 14a, respectively, providing shoulders for support of a cylindrical sleeve 16 which encloses the working parts of the transducer. The sleeve is secured to the flanges of the mounting blocks in any suitable manner, as for example by means of symmetrically disposed machine screws 18 (see Fig. 3). The block 12 has a centrally disposed circular recess 20 therein which intercepts a vertical passage 22 connecting the chamber 20 with the outlet fitting 10. A cap 24 of circular configuration has a centrally apertured hub 26 which extends into the recess 20 of the block 12 and is firmly held therein by a ring gasket 28 in an annular groove in the hub 26 and a ring gasket 29 encircling the hub 26. The gasket 28 insures a hermetical seal between the hub and the walls of the recess 20. A filter 30 is inserted in the end of the axial passage in the hub to prevent entrance of dust particles and the like into the pressure sensitive element. The cap 24 is provided on its side remote from the hub 26 with a series of concentric stepped depressions in one of which is mounted a ring gasket 32 which abuts a disc mount 34 for the pressure sensitive tube 2 and which insures hermetical seal between cap 24 and disc mount 34. The end of the pressure tube 2 remote from the armature 6 is silver soldered to a flanged plug 36 into which is silver soldered a short length of oxygen free copper tubing 38. The plug 36 is pressed and cemented into the disc mount 34 with the tubing 38 extending into the passage in the hub 26 and terminating short of the filter 30. A sleeve 40 which fits snugly about the cap 24 and extends for the major length of the transducer is secured to the cap by machine screws 42. The mount 34 is secured by three screws 44 to a cylindrical retaining member 46 for the field structure and the pick-off coils cooperating with the armature 6. An annular washer 48 having spaced apertures therein is interposed between the heads of the screws 44 and the disc mount 34. The parts 24, 48, 34 and 46 are held firmly together by a pair of machine screws 49 the heads of which are countersunk in the cap 24 and the shanks of which pass through alined openings in the washer 48 and mount 34 and thread into the member 46 at 50 (see Fig. 5). A ring gasket 51 is provided between the inner face of the mount 34 and the adjacent face of member 46 to insure a hermetic seal between the disc mount 34 and the inside of retaining member 46. A pin 52 which is press-fit into a hole 53 in member 46, extends through a hole in washer 48 and through a slot in disc mount 34 into a recess 54 in cap 24, thereby locating the disc mount 34 on member 46 and providing limitation of adjustment to prevent injury to the pressure sensitive tube. The magnetic pick-off unit of the transducer comprises a circular laminated four-pole field structure 56 and pick-off coils 58, 60, 62 and 64 mounted on the poles thereof. The field structure 56 is positioned between a shoulder 65 formed in the inner surface of the wall of member 46 and the cylindrical cuff 66 of an end closure member 68 for the retainer member 46. The laminations of the field structure are of magnetic material having a high permeability and are carefully insulated from each other. The coils 58, 60, 62 and 64 are wound on split bobbins, the halves of which are cemented together after being assembled on the pole pieces.

The armature 6 of the pressure sensitive tube 2 extends into the space between the pole faces so as to have flux interlinkage therewith. The laminated field structure 56 is provided with two apertures 69 and 70 therethrough, the former of which accommodates a locating finger 71 of a bracket to which is fastened a conventional thermostat 72 and the latter of which has a bushing 74 press-fit therein for accommodation of the leads to and from the pick-off coils and thermostat. To insure proper orientation of the laminated field within the retainer member 46, the laminations 56 are provided with an indexing notch 75 (see Fig. 5) into which the wall of the retainer member is dimpled after assembly of the field structure therein.

The cuff 66 of retainer closure 68 is cemented to the enclosing wall of the retainer member, the outer end of which is crimped over the cuff as indicated at 76 in Fig. 1. The closure is provided with a relatively large cylindrical passage 78 therethrough in which is cemented a disc 80 hermetically sealing off passage 78 and carrying a plurality of insulated terminal pins 82 for the leads to and from the pick-off coils and thermostat. Closure 68 is also provided with two longitudinal apertures 84 and 86 (see Fig. 5) within which are disposed magnetic shunt adjusting rods 88 and 90 respectively, having ratchet teeth formed therein for cooperation with teeth on an adjusting tool 92 shown in Fig. 5 to one side of the closure 68. The protruding ends of the rods 88 and 90 carry shunts 94 and 96 of magnetic material adapted by conjoint movement toward and away from the field structure to vary the scale factor of the instrument and, by individual movement, to zeroize the output signal for any desired position of the armature 6. The shunts are held in adjusted position by set-screws 97. A transverse passage 98 in the closure member 68 accommodates the toothed end of the tool 92. An end disc 100 is mounted in spaced relation to closure 68 by means of two posts 101 and 102, each of which is screw-threaded at one end into the closure member 68 and is secured at its other end to the disc 100 by a screw 103. A tube 104 for transmitting applied pressures from the fitting 8 to the chamber 106 of the retainer member 46 is pressed and cemented at one end into a passage 107 in closure 68 and is soldered at its other end into the sleeve 108 of a bushing 110 carried by the disc 100. Within the chamber 112 between the closure 68 and disc 100 is a transformer 114 which is mounted by means of a bracket 116 on the inner wall of the disc 100, three resistance elements 118, 119 and 120 which are mounted on a long screw 122 extending inwardly from the disc 100 and a terminal plate 121 carried by the transformer. Also mounted on the inner wall of the disc 100 is a terminal block 123 for the electrical connection of the heater now to be described.

The heater coil is shown best in Fig. 2. It comprises a plurality of turns 124 of insulated wire non-inductively wound on the sleeve 40 and secured in place thereon by insulating tape 125 of fiberglass or the like. Wound about the coil are a plurality of layers or sheets of insulating material 126 and wound about the insulating sheets is a sheet 128, the inner surface of which is of heat reflecting material as, for example, aluminum or tinfoil. The sheet 128 is secured about the underlying layers by means of insulating tape 130. The sleeve 40 is cut away adjacent the terminal block 123 to permit connection of the heater coil to terminals on the block. The complete circuit for the heater coil has not been illustrated but it will be understood that the thermostat 72 is connected in series therewith.

The disc 100 and block 14 of the transducer are secured together by means of a bolt 132 which threads into the disc, a split washer 133 being interposed between the disc 100 and a shoulder on the bolt, and an annular gasket 134 being provided between the disc and block. Disc 100 and mount 14 are provided with alined apertures 136 and 138 for passage of the circuit leads therethrough. A bushing 140 which is hermetically sealed in an aperture in the end mount by a ring gasket 140' couples the apertures together and encloses the wiring. Bushing 110 extends into a recess 141 in mount 14 and is hermetically sealed therein by a ring gasket 142, recess 141 being in communication with fitting 8 through a passage 144 in the mount. A screen 145 for preventing ingress of dirt is provided in bushing 110.

A cable junction shell 146 for the electrical wiring is mounted on the external surface of mount 14 in alinement with the passage 138, and a shielded cable 148 terminating in a conventional receptacle 150 is secured thereto.

From the foregoing description of the constructional details of the differential pressure transducer of the invention it will be apparent that chamber 106 of retainer member 46 within which are disposed the pressure sensitive tube 2, the thermostat 72, and the electrical pick-off means is hermetically sealed against leakage from chamber 112 and is in communication through tube 104 and bushing 110 with the fitting 8. The interior of the pressure tube 2 is likewise sealed against leakage and is in communication through tubing 38, filter 30, chamber 20, and passage 22 with the fitting 10.

The entire inner assembly is shock mounted in the mounts 12 and 14 by the ring gaskets 28, 140' and 142 on the respective parts 26, 140 and 110. With a constant temperature in chamber 106, the angular position of armature 6 will depend solely upon the difference between the internal and external pressures acting on the pressure tube 2. For many applications the temperature within chamber 106 may be held sufficiently constant by the heating coil as regulated by the thermostat within the chamber. For a precision instrument, however, it is preferred either to employ for the pressure tube 2 one that is constructed to be substantially insensitive to temperature variation or to incorporate in the circuit of the pick-off coils a thermistor of such size as to compensate for current changes due to temperature variations. In the particular transducer of Fig. 1, the latter expedient is availed of. Mounted within the chamber 106 on a bracket 152 secured to the wall of retainer member 46 is a thermistor 154 for incorporation in the circuit of the pick-off coils.

The circuit connections for the pick-off coils are illustrated diagrammatically in Fig. 7. Each of the coils forms one leg of a Wheatstone bridge with coils 58 and 60 connected in series and their junction connected to one output lead 155 and with coils 62 and 64 connected in series and their junction connected to the other output lead 156. The secondary of transformer 114 is connected across the two series circuits with the resistor 118 serially connected in one lead from the transformer secondary. Resistor 120, which serves for initial balance of the bridge, is connected in parallel with coil 62. With such a circuit an increase in inductance of coils 58 and 64 will occur with counter clockwise rotation of armature 6 as viewed in Fig. 7, and a corresponding decrease in inductance of coils 60 and 62 will occur. Conversely, when the armature 6 rotates in the opposite direction, the inductance of coils 60 and 62 will increase and that of coils 58 and 64 will decrease. Hence, by a suitable selection of the inductances of the pick-off coils, an electrical output signal varying with the position of the armature 6 is obtained.

With the circuit so far described, a change in armature position occasioned only by a change in temperature within chamber 106 would result in an output signal. To prevent such false signals the thermistor 154 is provided and connected in series with resistor 119 between the ungrounded end of the primary of transformer 114 and the junction of coils 58 and 60, and a resistor 157 of relatively low magnitude is connected between output lead 155 and ground. This arrangement not only compensates for temperature changes of the transducer but ties the output circuit to ground. That temperature compensation is effected will be clear from the following discussion. An increase in temperature causes the pressure tube 2 to untwist and thus rotates armature 6 in a counterclockwise direction as viewed in Fig. 7, increasing the inductance of coils 58 and 64 and decreasing the inductance of coils 60 and 62. Hence the potential at B, the junction of coils 62 and 64, with respect to ground (plus or minus) would tend to increase and that at A, the junction of coils 58 and 60, would tend to decrease. However, the decrease in resistance of thermistor 154 with the increase in temperature, will increase the current through resistor 157 and hence increase the potential at A and thereby reduce or nullify the output signal. Conversely, upon a decrease in temperature and clockwise rotation of armature 6, the inductance of coils 58 and 64 decreases, that of coils 60 and 62 increases, and the resistance of thermistor 154 increases to decrease the potential at A and thereby compensate for the decrease in potential at junction B and for the decreased potential difference across coil 58. Resistor 157 may be mounted within chamber 112 of the transducer or connected to the external circuit, as desired.

In order to adjust the scale factor of the transducer and also the position of balance, that is, to zeroize the output signal for any position of the armature 6, shunts 94 and 96 are provided. Each shunt, depending upon its position, diverts more or less flux from the armature 6. When the shunt 94 is moved closer to the laminations of the field, the inductance of coil 60 is increased, whereas that of coil 58 is not affected. Conversely, when the shunt 96 is moved closer to the field, the inductance of coil 58 is increased, whereas that of coil 60 is not affected. Thus by adjusting the shunts individually the output signal can be adjusted to zero for any desired pressure differential acting on the tube 2. When both shunts are moved closer to the field, the inductance of both branches of the Wheatstone bridge network is increased and hence the scale factor of the transducer is decreased. The tool 92 provides a convenient means for adjusting the shunts either separately or together. When the tool is inserted into the passage 98 so that its teeth engage the teeth of both of the pins 88 and 90, manual rotation of the tool moves the shunts together. In this way the position of both shunts may be adjusted together to increase or decrease the scale factor of the device. The desired position for shunt 96 is also obtained in this manner. When the tool is partially withdrawn so that the teeth thereon engage only the teeth of pin 88, shunt 94 may be individually adjusted to its desired position.

This arrangement permitting adjustment of the magnetic circut after assembly of the unit avoids the necessity of careful balancing of the circuit elements prior to assembly and permits the packaged unit to be standardized for ready replacement in installations under different conditions.

The transducer, as will be apparent from the foregoing description, is of sturdy construction. The only part thereof which might be subjected to strain is the field structure, the side portions of which (see Fig. 5) are relatively thin. By so recessing the inner wall of the enclosure member 46 that the field structure is engaged only along the upper and lower portions thereof, strain on the field structure is substantially eliminated as the structure is sufficiently strong to withstand some pressure in the direction of the pole pieces. The entire device occupies a minimum of space. A unit having an overall length of 6¼ inches and an external diameter of 2½ inches is suitable for use, for example, for delivering an output signal varying with the pressure differential acting on high speed aircraft.

With the described construction, functional parts such as the pressure tube 2, the pick-off structure and the like may be readily interchanged, thus facilitating mass production and permitting replacement of sub-assemblies for conversion to different specific applications.

The static pressure transducer of Figs. 4 and 6 differs from the transducer of Figs. 1, 2 and 5 only in that the pressure sensitive tube 2 is sealed off at 38' and a cap 158, which fits within a recess in member 24, is sealed to the disc 34 about the sealed off end of the tube. The hub of member 24 is supported in a suitable recess in an end mount 12' which differs from mount 12 only in the omission of the fitting 10 and passage leading thereto. The interior of tube 2 may be evacuated before sealing off of the end of the tube or the tube may be sealed off under pressure, depending upon the particular use to which the transducer is to be put, that is, upon the range of pressures to be detected and converted to electrical output signals.

It will be understood, of course, that the transducer of Figs. 1 to 5 can be used either as a differential pressure transducer or as a static pressure transducer, depending upon the instrumentalities connected to the fittings 8 and 10. For example, if fitting 8 is connected to a source of constant very low pressure, such as a vacuum pump, the electrical output signal will vary with the pressure within the pressure sensitive tube 2 and, conversely, if the fitting 10 is connected to such source of low pressure, this output signal will vary with the pressure in chamber 106 acting externally on the tube 2.

The invention has now been described with reference to preferred embodiments thereof. Obviously, various changes in the described construction and in the particular circuit connections could be made and various parts omitted without departing from the spirit of the invention or the scope of the accompanying claims. For example, when the transducer is to be used under substantially constant temperature conditions, the heating coil and thermostat control therefor could be omitted as well as the temperature compensation afforded by the circuit including the thermistor.

Other variations, both in the construction of the device and in the circuit connections, will be apparent to those skilled in the art.

The following is claimed:

1. A transducer for converting changes in fluid pressure to changes in an electrical signal comprising in combination, a cylindrical retainer member having a centrally apertured end wall and a cylindrical wall with a section of reduced thickness at the end thereof remote from said apertured wall to provide an internal annular shoulder, a circular laminated core having four reentrant poles mounted within and engaging said wall section and abutting said shoulder, a second retainer member having an end wall and a cylindrical mouth fitting within said wall section and abutting said core, a twisted Bourdon tube mounted in the aperture in the end wall of said first retainer member and hermetically sealed therein, said tube extending along the axis of the cylindrical wall and rigidly supporting a magnetic armature at its free end for cooperation with said poles, windings on said poles and means mounted in the end wall of said second retainer member for connecting said windings to an external circuit and for introducing fluid into the chamber defined by said retainer members.

2. The transducer according to claim 1 including means for introducing fluid to the interior of said Bourdon tube through the aperture in the end wall of said first retainer member.

3. The transducer according to claim 1 including a heating coil surrounding said retainer members, a wrapper having an inner heat reflecting surface disposed about said coil and thermostatic means positioned within the chamber defined by said retainer members for controlling the current through said coil.

4. The transducer according to claim 1 including adjustable magnetic shunts carried by the end wall of said second retainer member for minimizing the output signal from the windings for a desired armature position.

5. A transducer for converting changes in fluid pressure to changes in an electrical output signal comprising an outer casing provided at one end with means for coupling a cable thereto and with a fitting for coupling a source of fluid thereto, said cable coupling communicating with a passage for accommodation of electrical wiring and said fitting communicating with a passage terminating at the inner surface of the casing, an inner cylindrical casing within the outer casing defining an enclosure, one end of said inner casing having an opening therethrough, a conduit sealed in said opening and extending into said passage in the end of said outer casing for delivery of fluid from said fitting to said enclosure, a twisted Bourdon tube in said enclosure and mounted at one end in an end wall of said inner casing and extending axially therein, an armature fixed to said tube for rotation about the extended axis of the tube, a circular laminated field structure mounted in said enclosure with its periphery frictionally engaging the inner surface of the cylindrical wall of said inner casing and having four reentrant poles for flux interlinkage with said armature, windings on said poles, conducting members extending through one end of said inner casing and electrically insulated therefrom, circuit elements including a transformer, means for mounting said circuit elements in said outer casing, said windings being connectable through said conducting members with said circuit elements and with an external circuit through said cable coupling.

6. The tranducer according to claim 5 including a fitting on the other end of said outer casing for coupling a second source of fluid thereto, said fitting communicating with a passage in said other end of the outer casing, and a second conduit coupling said last mentioned passage to said Bourdon tube for delivery of fluid to the interior of the Bourdon tube.

7. The transducer according to claim 5 wherein said inner casing comprises a cylindrical retainer and a closure cap therefor hermetically sealed to the retainer, said cap forming one end of the inner casing and being provided with a pair of parallel longitudinal passages therethrough, a toothed rod disposed in each of said longitudinal passages, magnetically permeable members within the enclosure carried on the ends of said rods and each adapted to shunt from the armature part of the flux passing through a pole of said field structure, and an elongated tool having teeth thereon for cooperation with the teeth on said rods, said cap having a transverse passage therein for reception of the toothed end of said tool whereby the position of said permeable members with respect to said field structure can be adjusted jointly and separately after assembly of said cap on said retaining member.

8. The transducer according to claim 5 wherein said outer casing includes two end mounts, and wherein means are provided for supporting said inner casing from said end mounts, said last mentioned means including cushioning rings providing shock-proof mounting in the outer casing for said inner casing and for the parts therein.

9. The transducer according to claim 1 including an outer cylindrical casing enclosing said retainer members, said outer casing including two end mounts and means shock-proofedly mounting said retainer members in said mounts.

References Cited in the file of this patent
UNITED STATES PATENTS

| | | |
|---|---|---|
| 2,510,073 | Clark | June 6, 1950 |
| 2,539,833 | Hathaway | Jan. 30, 1951 |
| 2,563,899 | Wiancko | Aug. 14, 1951 |
| 2,581,359 | Clark | Jan. 8, 1952 |
| 2,618,776 | Wiancko | Nov. 18, 1952 |
| 2,636,386 | Schultheis | Apr. 28, 1953 |